United States Patent [19]

Silveri et al.

[11] Patent Number: 4,812,205
[45] Date of Patent: Mar. 14, 1989

[54] PROCESS FOR SECONDARY FIBRE PROCESSING

[75] Inventors: Luigi Silveri, Rockford, Ill.; Stavros Paraskevas, Pittsfield, Mass.

[73] Assignee: Beloit Corporation, Beloit, Wis.

[21] Appl. No.: 148,456

[22] Filed: Jan. 25, 1988

[51] Int. Cl.⁴ .................. B02C 23/08; B02C 23/14
[52] U.S. Cl. .......................... 162/4; 162/55;
    241/24; 241/46.17; 241/81
[58] Field of Search ............... 162/4, 55; 241/24, 28,
    241/46.17, 81, ; 209/3, 12, 38

[56] References Cited

U.S. PATENT DOCUMENTS

| | | | |
|---|---|---|---|
| 3,670,968 | 6/1972 | Galeano | 241/24 |
| 3,925,150 | 12/1975 | Marsh | 162/55 |
| 4,017,033 | 4/1977 | Tra | 162/4 |
| 4,334,984 | 6/1982 | Vogac et al. | 162/55 |
| 4,341,353 | 7/1982 | Hamilton et al. | 241/24 |

Primary Examiner—Peter Kratz
Attorney, Agent, or Firm—Dirk J. Veneman; Raymond W. Campbell

[57] ABSTRACT

A method of processing baled secondary fibre furnish is provided. The method includes the steps of breaking the baled furnish, dry screening the furnish to remove abrasive contaminants, and then repulping the dry screened furnish.

6 Claims, 2 Drawing Sheets

PROCESS FOR SECONDARY FIBRE PROCESSING

BACKGROUND OF THE INVENTION

The present invention relates generally to preparing pulp which, in turn, is used in papermaking machines to make paper and paperboard products. More specifically, the present invention relates to processing secondary fibre furnishes for the manufacture of paper and paperboard products.

It is known to use secondary fibre furnishes in papermaking machines. In order to process the secondary fibre furnishes into paper and paperboard products, it is necessary to remove contaminants from the secondary fibre furnishes. Such contaminants typically include broken glass, sand, metal wire, string, plastic and others. Although it is necessary to remove sufficient contaminants to provide a sufficiently pure pulp, it is desirable to minimize the amount of fibrous material that is removed with the contaminants.

Typically, the prior art processes for processing secondary fibre furnishes to pulp utilized a first step of conveying the baled furnish to a repulper for defibering while at the same time removing contamination from the stock. The stock is then treated to remove high specific weight contaminants and the stock is then sent through a secondary pulper.

It is also known in the art, to utilize in lieu of the secondary pulper a high consistency pressure screen. However, since the pressure screen does not induce deflaking, a good percentage of the stock must be rejected and treated through a deflaker before it is processed by an atmospheric screen for final contaminant removal.

These prior art repulping methods of processing secondary fibre furnishes suffer numerous drawbacks. Once the baled furnishes with all their abrasive and plastic contaminants are subject to repulping, it becomes difficult to separate these contaminants from the fibre because of their reduced form. This results in high process energy demands due, in part, to extensive hydraulic treatment of the slurry. Moreover, the prior art repulping process typically results in inferior end product cleanness due to the excessive recirculation of rejects in the various reject treatment stages that reduce the contaminants' size and thereby renders their removal difficult.

Furthermore, the typical prior art secondary fibre processes result in diluted final rejects that are difficult to dispose of either by burning or trucking to landfills. These prior art processes also result in increased mill effluent that contributes to the cost of operation and adversely effects the environment.

The prior art processes also frequently do not provide a satisfactory product. Because of the extensive reject recirculation loop, there is a high degree of degradation of the fibre.

Prior art processes have been limited to operation in the range of consistencies up to about four percent. At consistencies greater than four percent, raggers will not operate and bales cannot be submerged in a continuous process.

Moreover, with respect to the equipment utilized in the process, there are disadvantages when utilizing typical secondary fibre processing methods. The prior art processes usually result in increased cost for equipment maintenance due to the abrasive contaminants that are present in the furnishes in the repulping and coarse screening modules. Furthermore, the typical prior art processes for secondary fibre processing have a high cost of capital equipment, piping, and installation.

Accordingly, there is a need for an improved secondary fibre recycling process.

SUMMARY OF THE INVENTION

The present invention provides a method and apparatus for treating secondary fibre furnishes for the manufacture of paper and paperboard products. The method comprises the steps of: breaking the baled furnish; separating abrasive contaminants from the furnish; and conveying the furnish to a repulping vessel where the furnish is repulped. Plastic contaminants can be removed from the furnish during the repulping step.

Preferably, the method includes the step of removing long metal wires from the furnish by using a magnet as the abrasive contaminants are separated from the furnish.

Preferably, the abrasive contaminants are separated from the furnish by passing the furnish over at least one disk screen. In an embodiment of the invention, the rejected material that includes the abrasive material that is separated from the furnish by the disk screen is passed over a second disk screen to recover fibrous material present therein. The rejected material that passes by the second disk screen can then be passed by another means for recovering fibrous material.

In an embodiment of the method, the fibrous material is steamed and/or wetted before it is repulped.

Accordingly, it is an advantage of the present invention to provide an improved method of processing secondary fibre furnishes for the manufacture of paper and paperboard products.

A further advantage of the present invention is that it provides a method that reduces the wear on the processing equipment by removing the abrasive contaminants before the secondary fibre is repulped.

Another advantage of the present invention is that it provides a method of treating the fibrous material prior to repulping that provides for a quicker repulping of the fibrous material at lower energy requirements.

Another advantage of the present invention is that it provides a cleaner resultant pulp.

Still another advantage of the present invention is that it permits high consistency continuous pulping.

A further advantage of the present invention is to provide for an improved separation of final rejects, i.e., contaminants, that allows for more easy disposal of the contaminants.

Additional advantages and features of the present invention are described in, and will be apparent from, the detailed description of the presently preferred embodiments and the drawings.

DETAILED DESCRIPTION OF THE PRESENTLY PREFERRED EMBODIMNTS

The present invention provides an improved method and apparatus for secondary fibre processing. The process of the present invention results in a repulping and decontamination of the secondary fibre producing a usable fibre for the manufacturing of paper and paperboard.

Figure 1:
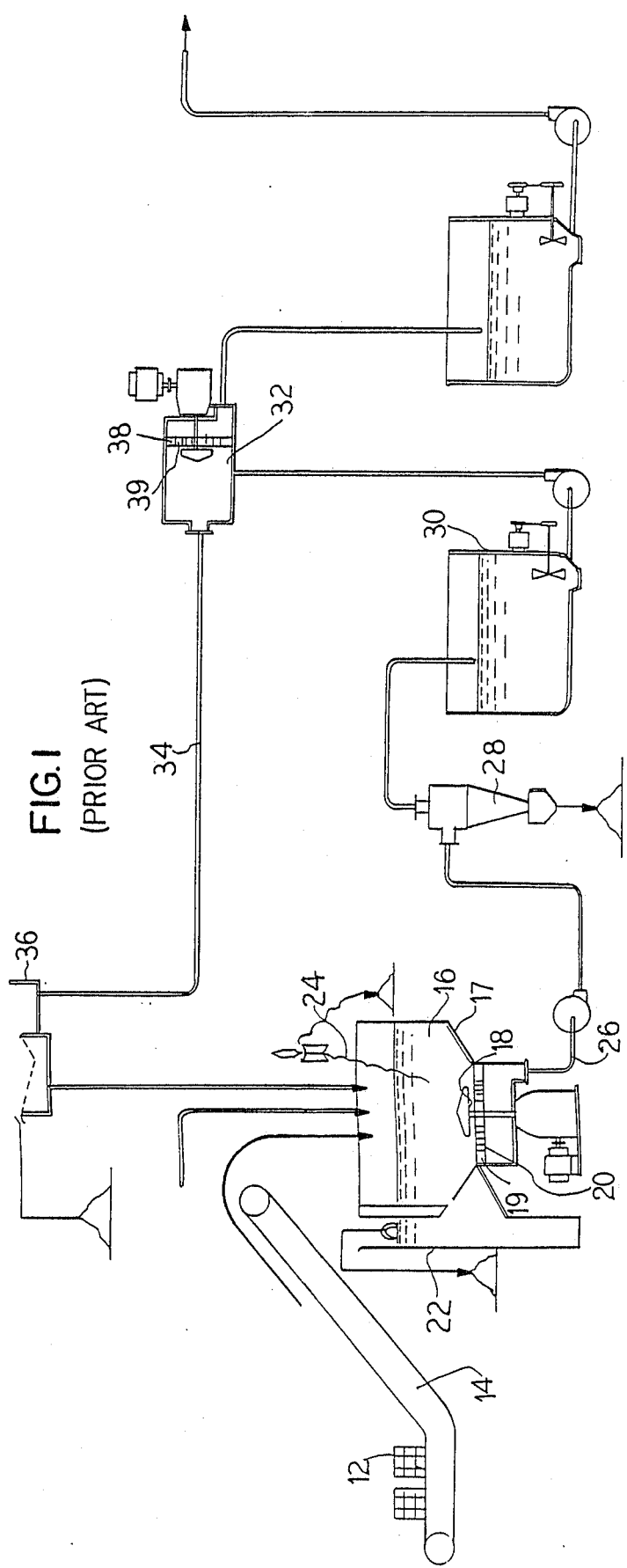
FIG. 1 illustrates a schematic of a prior art method of secondary fibre processing.

Referring to FIG. 1, a schematic of a prior art method for processing baled secondary fibres is illustrated. As illustrated, baled furnish 12 is continuously conveyed on a conveyor 14 into a repulper 16. The repulper 16 includes a repulping vessel 17, a defibring rotor impeller 18, and perforated extraction plate 19 having perforations 20. The repulper 16 defibres the baled furnish 12 at a consistency range of approximately 2% to about 4%. The resultant defibred stock is continuously extracted through the perforated extraction plate 19 that is located beneath the defibring rotor impeller 18. The perforations 20 in the extraction plate 19 can vary from between approximately ⅛ of an inch to about 1 inch in diameter, depending upon the degree of furnish contamination. The more contaminated the furnish, the larger the perforations 20 or extraction holes. Increasing the size of the perforations 20 prevents plugging of the repulper 16 that can result in loss of production.

A junk tower 22 is located adjacent to the repulper vessel 17 and helps remove large size contaminants. A ragger rope 24 is provided to catch long strips of plastic, string, and bale wire that are in the baled furnish. The ragger rope 24 gradually removes these contaminants from the top of the repulper vessel 17.

The resultant stock is then extracted through line 26. This extracted stock is only approximately 90 to about 95% defibred and contains a high degree of broken down contaminants.

The stock is then treated in a liquid hydrocyclone 28. The liquid hydrocyclone 28 removes high specific weight contaminants such as metal, sand, broken glass, and the like. The stock is then fed to a dump chest 30 and to a secondary pulper 32. The secondary pulper 32 also acts as a coarse screen, in order to defibre the remaining flakes and rejects medium size contaminants. To this end, medium size contaminants are fed through line 34 along with 15% of the fibre production to an atmospheric screen 36. The atmospheric screen 36 accepts the fibre and returns it to the repulper 16 and rejects the coarse contaminants. The accepted stock in the secondary pulper 32 is then fed through a perforated extraction plate 38 having holes 39 of approximately ⅛ of an inch to about 3/16 of an inch in diameter. The stock then is preferably further processed by fine screening and cleaning in order to acquire acceptable paper or paperboard making quality.

Figure 2:
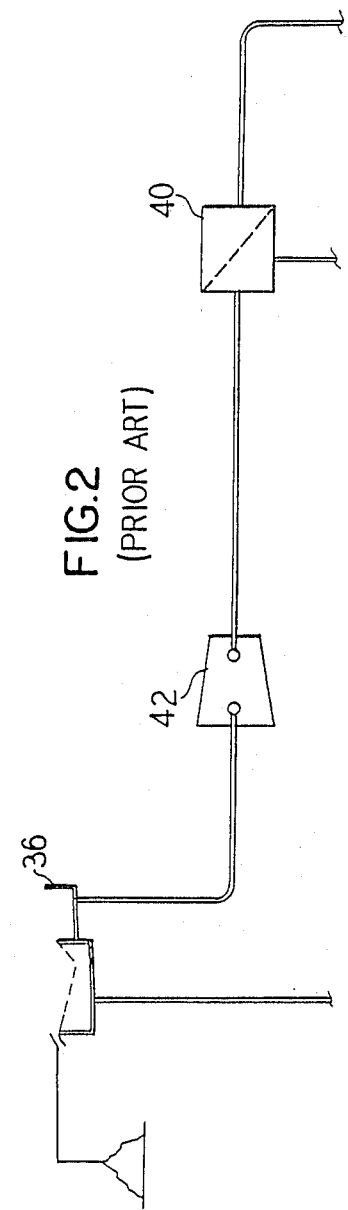
FIG. 2 illustrates a variation of the prior art method of secondary fibre processing illustrated in FIG. 1.

FIG. 2 illustrates a variation of the prior art method illustrated in FIG. 1. As illustrated in FIG. 2, in lieu of the secondary pulper 32, some systems utilize a high consistency pressure screen 40 having 0.060 inch to 0.125 inch diameter screening perforations. However, since the pressure screen 40 does not induce deflaking, approximately 25% to about 30% of its feed flow must be rejected and treated through a deflaker 42 before it is processed by the atmospheric screen 36 for final contaminant removal.

As previously stated, these prior art repulping processes suffer numerous disadvantages including: high process energy demands; inferior end product cleanliness; diluted final rejects; increased mill effluents; high degradation of the fibre; high equipment maintenance; and high cost of capital equipment.

The present invention overcomes the disadvantages of these prior art processes. To this end, the present invention provides a new method of processing secondary fibre furnishes.

Figure 3:
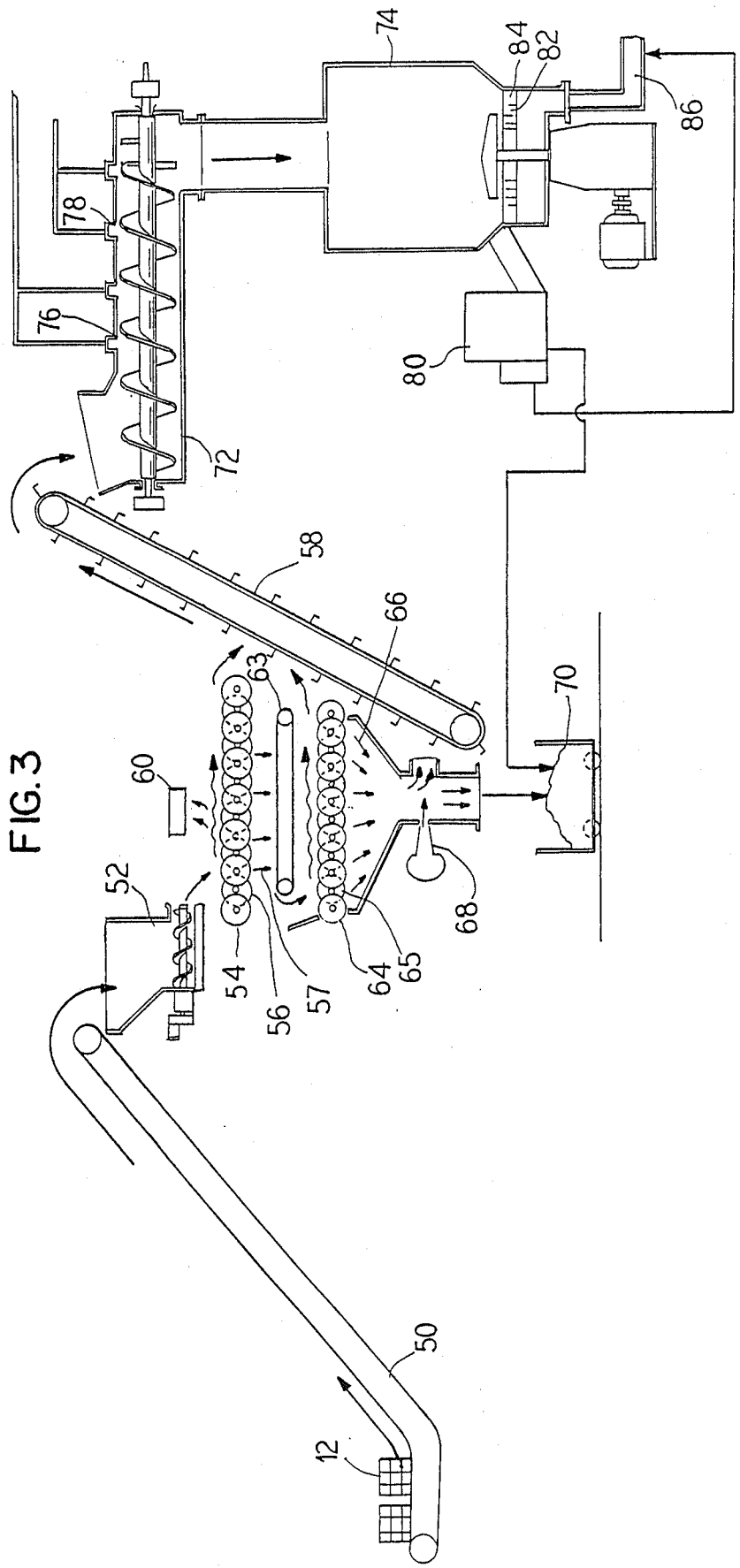
FIG. 3 illustrates a schematic of the method of secondary fibre processing of the present invention.

Referring now to FIG. 3, a schematic of the method for secondary fibre processing of the present invention is illustrated. As illustrated, the baled furnish 12 is continuously conveyed by a conveyor 50 and dropped into a bale breaking and moderate size reduction apparatus 52. In the bale breaking and moderate size reduction apparatus 52, the baling wires are broken and individual sheets of board or paper are extruded and dropped onto a first disk screen 54.

The first disk screen 54 includes rotating radially interferring disks 56 that have preset gaps that are constructed so that abrasive contaminants, such as broken glass, sand, broken wire, and the like, pass through the preset gaps and fall in the direction indicated by the arrows 57. However, the first disk screen 54 is constructed so that the larger fibrous material in the furnish is conveyed on top of the disks 55 and dropped onto a feeder conveyor 58. As discussed in more detail below, from the feeder conveyor 58, the large fibrous material is further processed to pulp. Located above the first disk screen 54 is a magnet 60 that is situated so that it attracts any large wires such as are used to bale the furnish. These wires are then discarded from the magnet 60.

The rejected material that drops through the first disk screen 54 may contain, along with abrasive contaminants, fibrous material. To recover any such fibrous material, a second disk screen 64 is provided. Accordingly, the rejected material is collected by a conveyor 63 that then drops the rejected material onto a secondary disk screen 64. The secondary disk screen 64 also includes rotating, radially interferring disk 65 having predetermined gaps therebetween. The secondary disk screen 64 functions to recover fibrous material that may have passed through the primary disk screen 54. To this end, fibrous material is collected on the rotating, radially interferring disk 65 of the screen 64 and are conveyed along the top of the disk and fed to the conveyor 58. As discussed in further detail below, this fibrous material is also then further processed.

To insure that only a minimal amount of fibrous material is lost and not processed, the rejected material from the secondary disk screen 64, indicated by arrows 66, is treated again to recover fibrous material that may be contained therein. To this end, the rejected material is passed by an air knife 68. The air knife 68 functions to insure that only a minimal fibre amount is finally rejected. Accordingly, the air knife 68 functions to separate fibre from the rejected material that has fallen through the secondary disk screen 64. The air knife 68 blows fibres contained in the rejected material onto the conveyor 58 while allowing the nonfibre rejects, i.e., abrasive contaminants, to fall into a dumpster 70. The disk screens 54 and 64 and air knife 68 cooperate to provide a process that minimizes the fibre content in the final rejected material.

The resultant dry screened furnish located in the feed conveyor 54 is carried by the feed conveyor to a conveying apparatus 72. The conveying apparatus 72 functions, in part, to convey the dry screened furnish into a repulping vessel 74. The conveying apparatus 72 also functions to prepare the dry screened furnish for repulping. To this end, the conveying apparatus 72 includes a presteaming apparatus 76 and shower apparatus 78. Preferably, within the conveying apparatus 72, the dry screened furnish is first treated with steam that is injected into the conveying apparatus 72 through the presteaming apparatus 76. The furnish is then wetted by the shower apparatus 78. The shower apparatus 78 wets the furnish and thereby functions to induce a fast submergence and the immediate breakdown of the furnish at the very beginning of the repulping sequence. The length and retention time of the dry screened furnish within the conveying device 72 is a function of both the production rate and strength characteristics of the furnish. It may be desirable, depending upon requirements, to only steam or wet the furnish.

The presteamed and wetted furnish is dropped by the conveying apparatus 72 into a repulping vessel 74. Due to the method of the present invention, this furnish is free of abrasive contaminants and is presteamed and wetted. Accordingly, submergence is immediate and defibring takes place at lower energy requirements. Due to the faster repulping process, plastic contaminants, subjected to shorter pulping action, are not broken down and are much easier removed, which allows for cleaner pulp downstream. This is due, in part, to the fact that the plastic contaminants are larger in size. The plastic contaminants are removed via line 80 to the dumpster 70.

The resultant pulp is removed from the repulping vessel 74 by being extracted through perforations 82 in a perforated plate 84. The extracted pulp is then removed via line 86 and can be processed to make paper and paperboard products.

The present process can be operated at consistency much greater than previous continuous processes. Whereas previous continuous processes were limited to operation up to about four percent consistency, the present process can be operated as a high consistency process up to about 15 percent consistency.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method of processing baled secondary fibre furnishes for the manufacture of paper and paperboard products comprising the steps of:

conveying the baled furnish to an extruder for breaking the bale and moderately reducing the size of the furnish;

separating abrasive contaminants from fibrous material in the furnish by passing the furnish over a first disk screen, the disk screen separating the furnish into fibrous material and rejected material;

moving the fibrous material to a conveying apparatus for conveying the fibrous material to a repulping vessel;

steaming and wetting the fibrous material in the conveying apparatus;

conveying the steamed and wetted fibrous material to the repulping vessel; and removing plastic contaminants from the fibrous material and repulping the fibrous material into a pulp.

2. The method of claim 1 including the steps of passing the rejected material separated from the furnish over a second disk screen and recovering fibrous material contained therein.

3. The method of claim 2 including the steps of passing the rejected material that has passed through the second disk screen passed an air knife and recovering fibrous material contained therein.

4. The method of claim 2 including the step of passing the recovered fibrous material to the conveying apparatus.

5. The method of claim 3 including the step of passing the recovered fibrous material to the conveying apparatus.

6. The method of claim 1 including the step of passing the furnish by a magnet to remove elongated metal wires.

* * * * *